May 9, 1939.  W. H. DE LANCEY  2,157,258
SHUTTER OPERATING MECHANISM FOR REGISTERS OF LIQUID DISPENSING APPARATUS
Filed Aug. 17, 1937  6 Sheets-Sheet 1
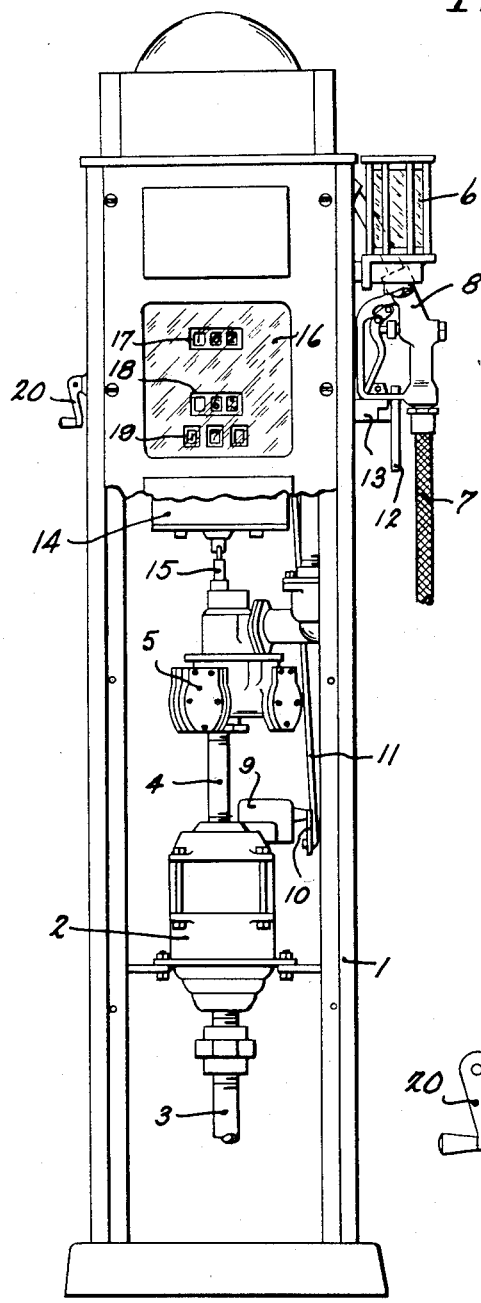
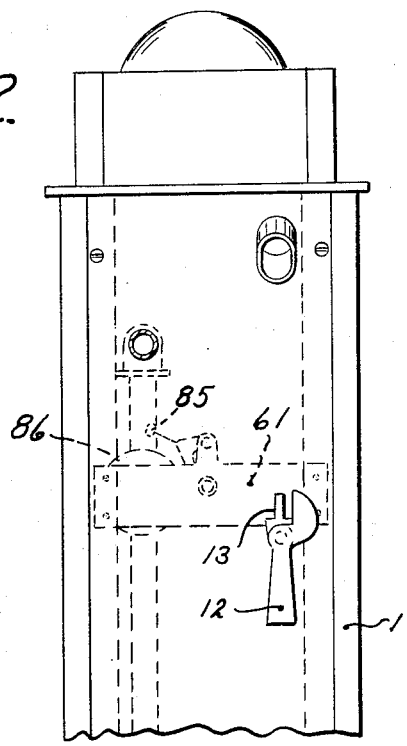
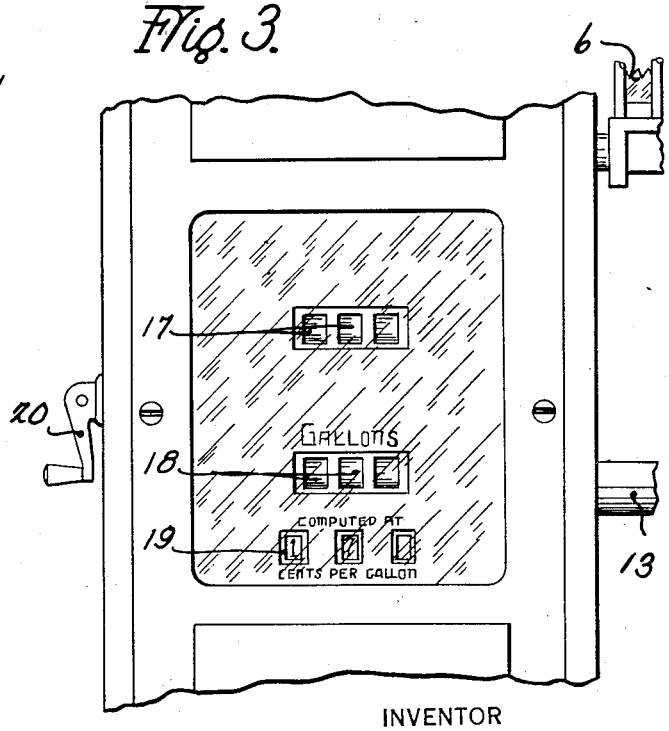
INVENTOR
WARREN H. DELANCEY
BY
Chapin & Neal
ATTORNEYS

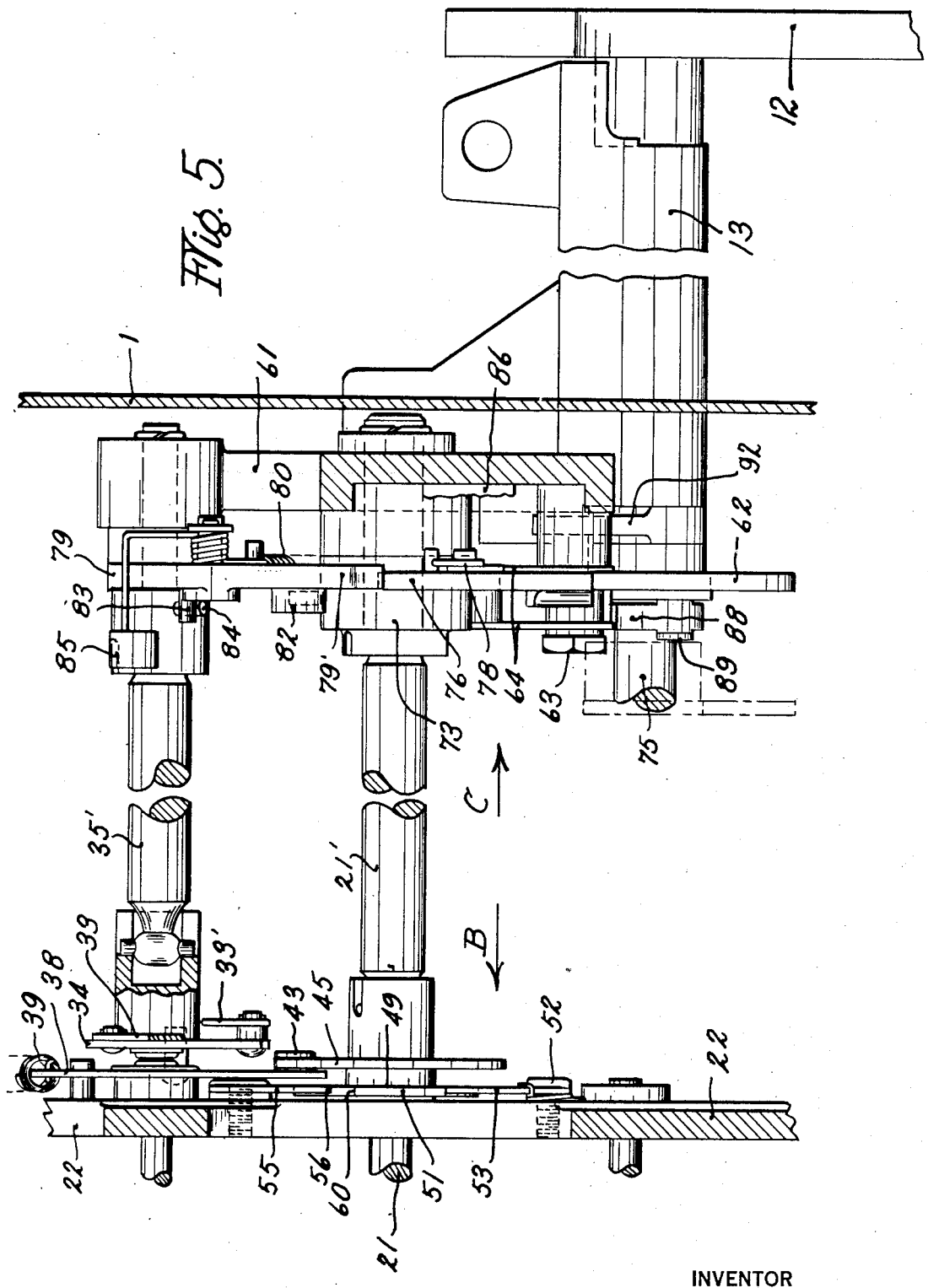

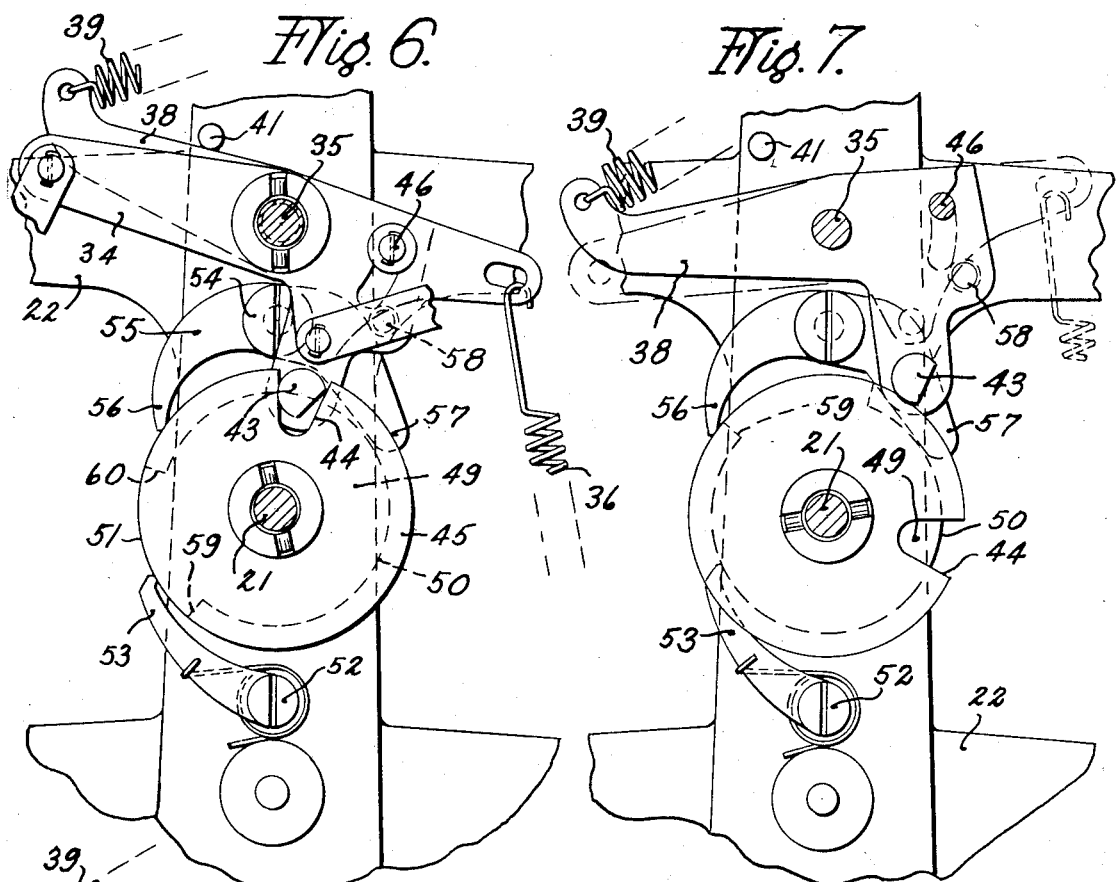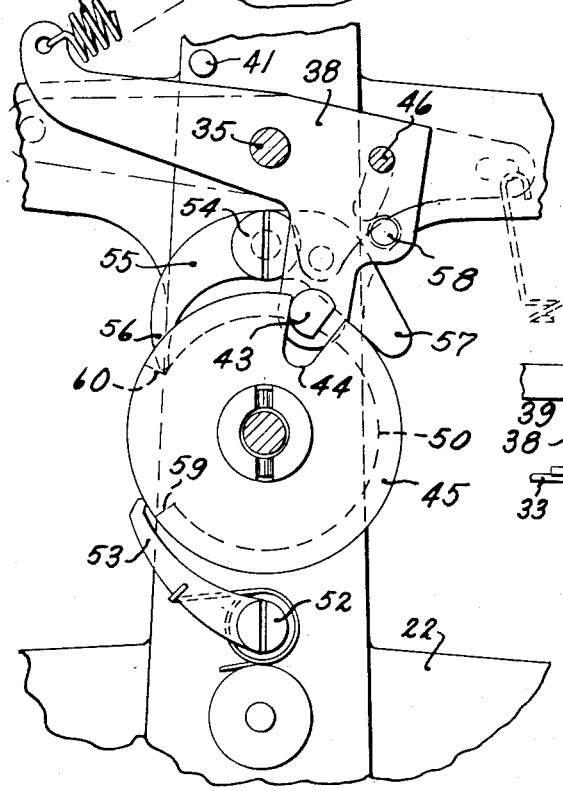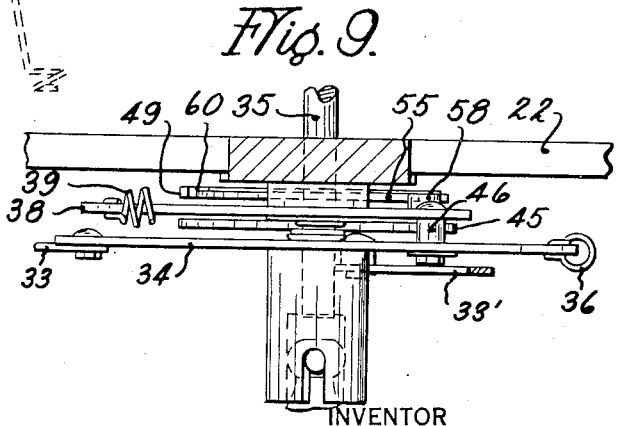

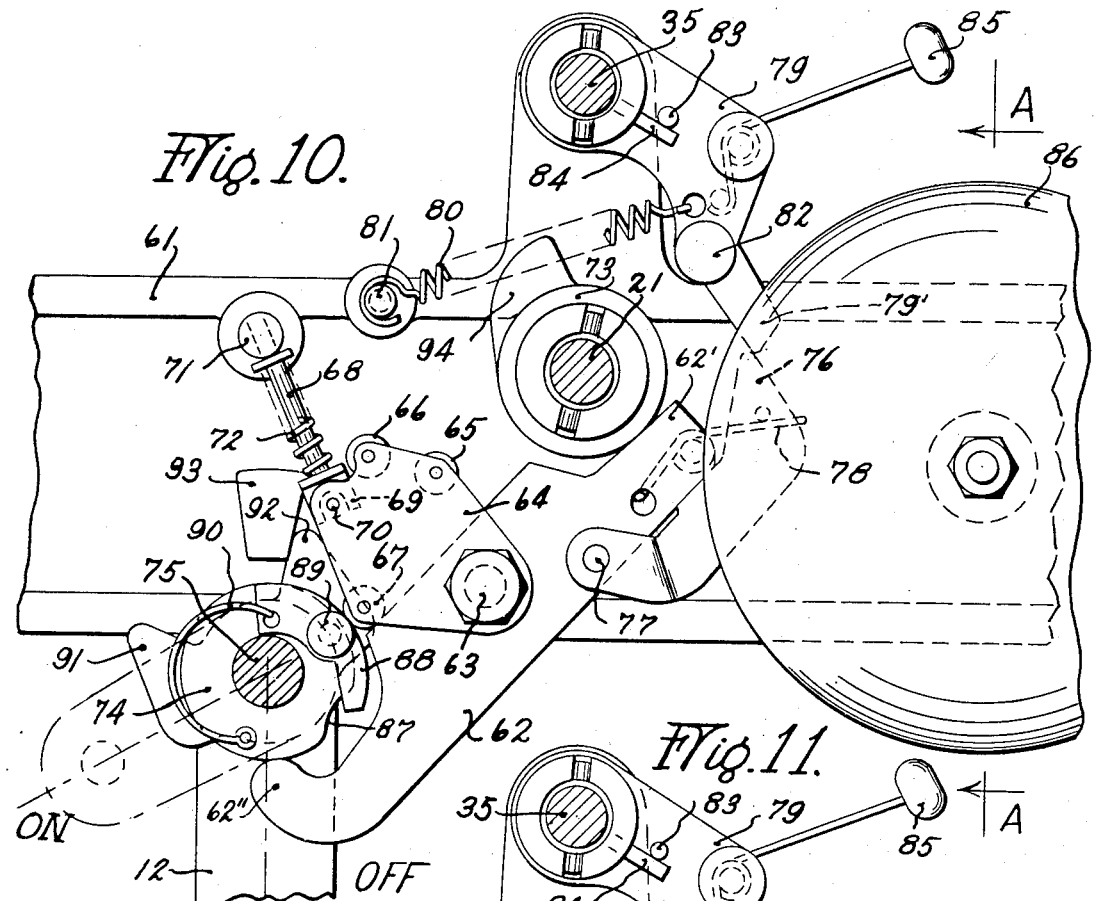
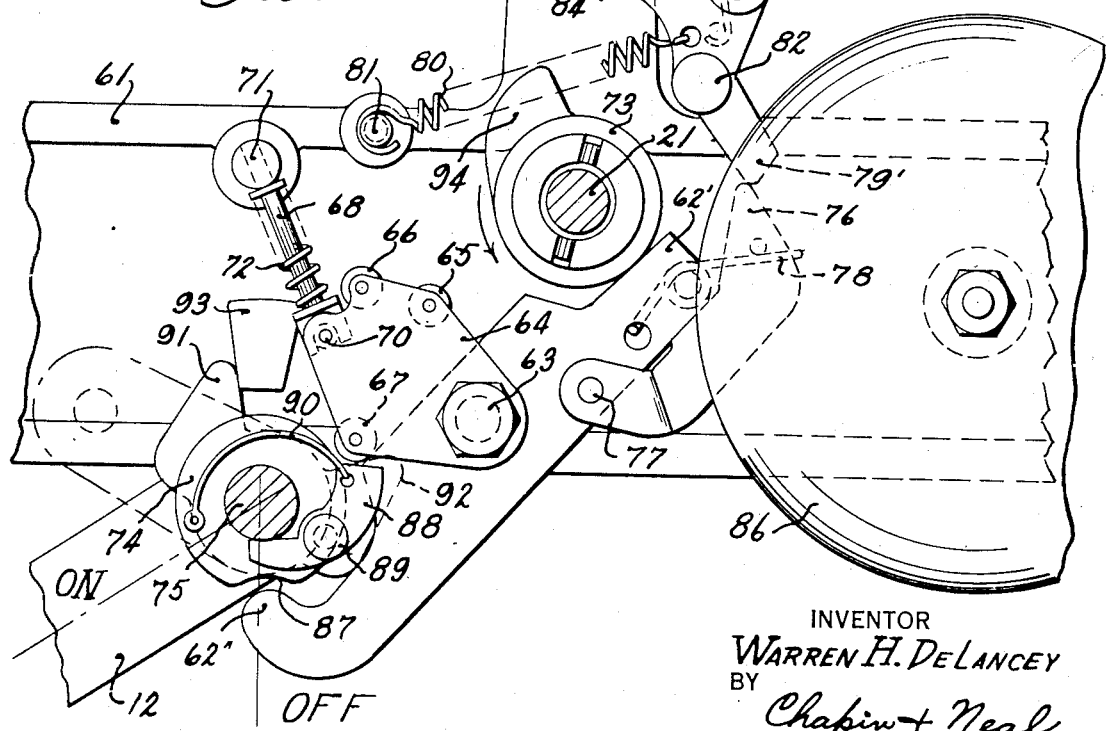

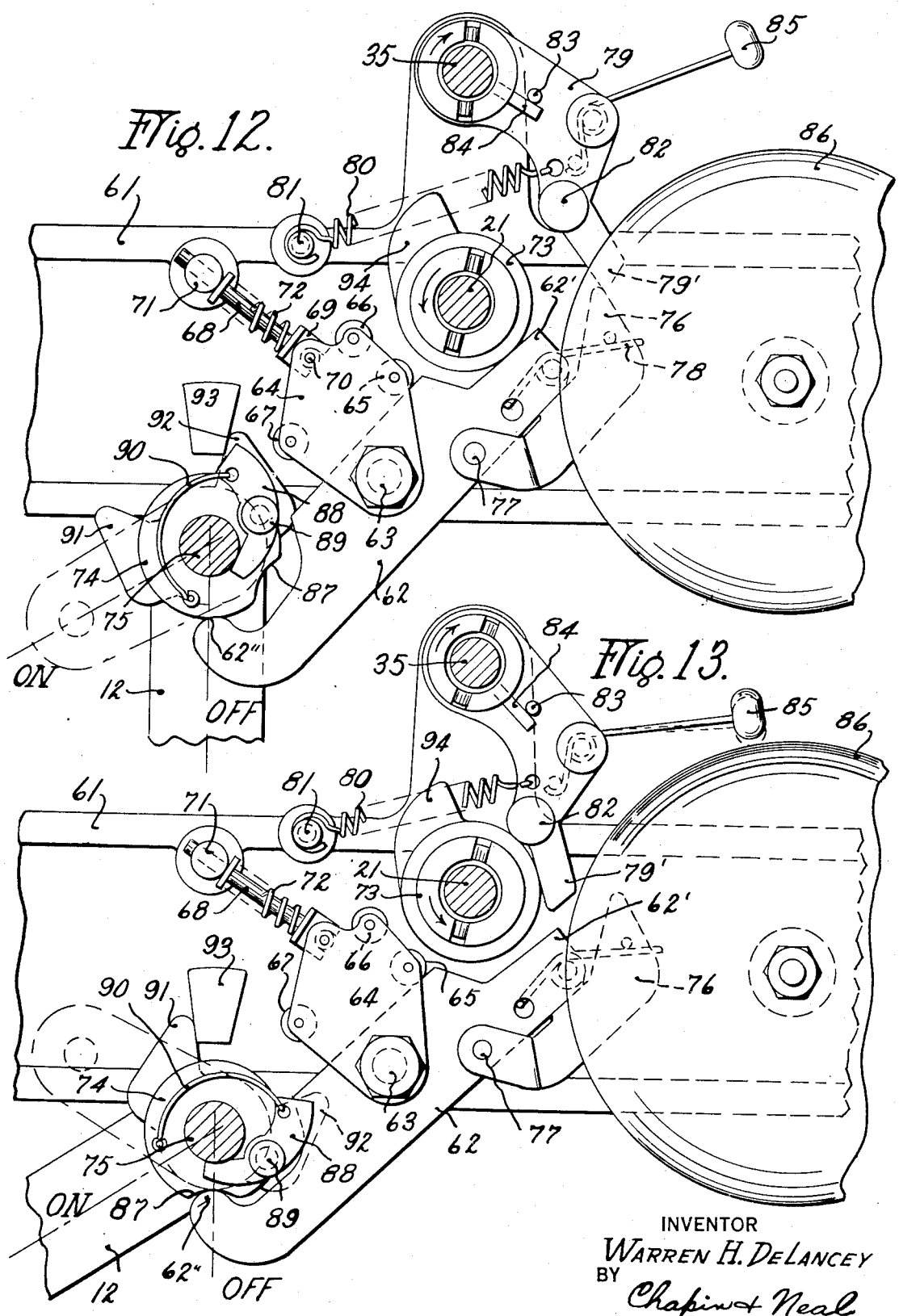

UNITED STATES PATENT OFFICE 2,157,258

SHUTTER OPERATING MECHANISM FOR REGISTERS OF LIQUID DISPENSING APPARATUS

Warren H. De Lancey, Springfield, Mass., assignor to Gilbert & Barker Manufacturing Company, West Springfield, Mass., a corporation of Massachusetts Application August 17, 1937, Serial No. 159,517

2 Claims. (Cl. 221—95)

This invention relates to liquid dispensing apparatus of the type generally employed in supplying gasoline to automobiles and for similar purposes. In apparatus of this type there is usually provided a motor driven pump for establishing the flow, a meter register with a display indicator for showing the amount of the dispensed flow, and resetting mechanism for zeroizing the indicator preparatory to each new dispensing operation.

The present invention has for its object the application of certain controls for insuring the proper operation of the resetting mechanism to the end of preventing any fraudulent manipulation of the pump in the dispensing operation. For example, it is desirable that when a resetting operation has been started that it be completed so as to return the indicator all the way to zero. It is also desirable to insure that the resetting of the indicator be performed after each dispensing operation and before the next dispensing operation.

The principal means for accomplishing these objects is a shutter for the display indicator which may be opened to reveal and closed to conceal the indicator, together with means for automatically closing this shutter upon the start of a resetting operation, and keeping it closed until the indicator has reached zero. In conjunction with the foregoing, independent means are provided to close this same shutter in the event that the attendant, after completing one dispensing operation and shutting off the motor, attempts to start the motor again for a new dispensing operation without in the meanwhile having reset the indicator to zero.

In the commercial use of such dispensing apparatus it is expected that the attendant will not attempt to dispense gasoline therefrom with the shutter closed, whereby neither he nor the customer can see the indicator nor determine how much gasoline is being dispensed. Therefore, for all practical purposes, the closing of the shutter and concealment of the indicator under the conditions specified above, will act as a sufficient inducement to compel the attendant to operate the apparatus in the proper manner.

Further improvements and advantages of the present invention will be apparent from the following detailed description taken in connection with the accompanying drawings in which:

Fig. 1 is a front elevation of the dispensing apparatus or pump with the front panel of the casing partly broken away to show interior parts. In this view the shutter for the indicator is in open position.

Fig. 2 is a fragmentary detail of the upper end of the pump casing, looking at the right side thereof;

Fig. 3 is an enlarged fragmentary detail looking at the dial face of the pump and showing the shutter for the indicator in closed position;

Fig. 5 is a vertical section through the handle bracket and register frame looking in the direction of the arrows A—A of Fig. 10;

Figs. 6, 7 and 8 are detail side views of certain parts of the shutter operating mechanism in different positions of action. It will be understood that these views are looking in the direction of arrow B in Fig. 5.

Fig. 9 is a fragmentary detail showing a top plan of the parts in Figs. 6, 7 and 8;

Figure 4:
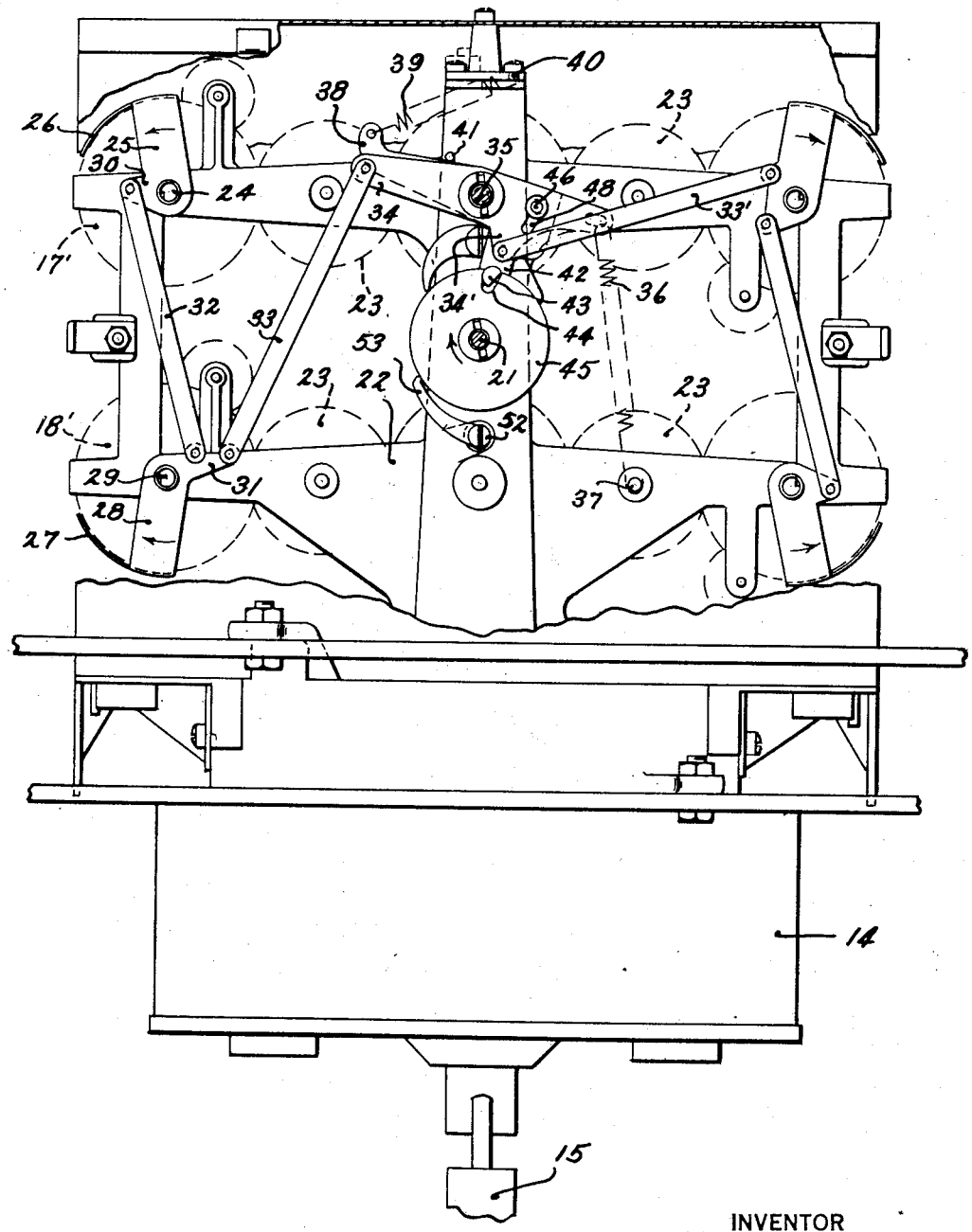
Fig. 4 is a detailed right end view of the register frame showing the operating devices for the shutter.

Figs. 10 and 11 are detail views showing the motor control handle and parts associated therewith for operating the shutter. Both of these views show the parts after a reset or zeroizing operation; in Fig. 10 the control handle is in "off" position, and in Fig. 11 the control handle is in "on" position. These views are looking in the direction of arrow C, Fig. 5.

Figs. 12 and 13 are similar views of the same parts, but in a condition wherein the reset has not been made; in Fig. 12 the control handle is in "off" position, and in Fig. 13 the control handle is in "on" position.

Referring more particularly to the drawings, 1 indicates the pump casing; 2 a combined motor and pump unit adapted to draw gasoline through an intake pipe 3 from a supply (not shown) and deliver the same through outlet pipe 4, flow meter 5, visual flow indicator 6, flexible delivery hose 7, and discharge nozzle 8, all in the usual manner of such pumps. It will be understood that the motor control switch is contained within the casing 9 and that the switch therein for starting and stopping the motor is operated through crank arm 10, connecting link 11, and control handle 12, the latter adapted to be turned by the attendant. In Figs. 1 and 2 the control member or handle 12 is in its "off" position and the switch at 9 is open for stopping the flow. A further feature common to this class of pumps is that the discharge nozzle 8 when not in use is adapted to rest upon a fixed support 13 extending from the pump casing 1 and coacts with an extended portion of the control handle 12 in such manner that when the nozzle is in position upon its support the control handle may not be turned to "on" position, and conversely when the control handle is in "on" position the nozzle may not be returned to its support 13.

Within the upper portion of the pump casing is mounted a register and its indicator, the lower part of which appears in Fig. 1 at 14. This register indicator is of well known design and need not be particularly described. It is adapted to be operated in the usual manner from the flow meter 5 through a meter shaft 15 and it is provided with the usual dial face 16 with openings therein at 17, 18, and 19 for displaying therethrough different dial wheels or indicators of the register. In present day pumps these register indicators are arranged to indicate both the quantity of liquid dispensed on one set of dial wheels, and the cost in money value of the same on another set of dial wheels. Accordingly at the openings 17 the dial wheels of the cost value are shown and in the openings 18 the dial wheels for the quantity are shown. In the openings 19 the dial wheels showing a unit price per gallon are shown. These register indicators are commonly provided with a resetting mechanism for returning the cost and quantity dial wheels to zero by hand manipulation. This resetting mechanism usually comprises a rotatable shaft extending transversely through the register mechanism from one side to the other of the pump casing. The handle for rotating this reset shaft is indicated at 20 in Figs. 1 and 3. The reset shaft itself, partly shown in some of the other views, is indicated at 21. It will be understood that a complete rotation of said reset shaft is required to reset back to zero the indicating dial wheels at 17 and 18, known as the zeroizing or resetting operation.

Referring now to Fig. 4, I have here shown so much of the register and indicator mechanism as will be sufficient for an understanding of the present improvement and have omitted therefrom other detail parts for the sake of clearness. The supporting frame 22 of said register has mounted thereon a series of gears 23 shown in dotted lines for operating in the usual manner dial wheels 17' also in dotted lines. In the particular register here shown there are dial wheels both for display at the front and the back of the pump casing. Consequently, in large part, there is a duplication of mechanism to the left and right of the central line of Fig. 4. The dial wheels 17' are the money cost dial wheels and the dial wheels 18' are the quantity dial wheels.

Pivoted on the frame 22 at 24 is a shutter arm 25 carrying a shutter 26 for the dial wheels 17'. As shown, the shutter 26 is a curved member conforming to the curvature of said dial wheels and the pivotal axis of the arm 25 coincides with the axis of said dial wheels 17' so that the shutter member 26 will travel over the surface of said dial wheels in its opening and closing movements. It will also be understood that the shutter arm 25 will carry a plurality of members 26, one for each of the dial wheels 17' of the register. A similarly arranged shutter 27 is provided for the dial wheels 18' and the supporting arm 28 therefor is pivoted at 29 in the lower part of the frame 22. The shutter arms 25 and 28 have crank projections 30 and 31 connected by links 32 so that said shutters will move together in their closing and opening movements. In Fig. 4 the shutters are shown in open position so as to reveal the movements of their respective dial wheels through the openings 17 and 18 of the dial face 16.

An operating link 33 is connected to the crank arm 31 of the lower shutter 27. Said link 33 also connects to a double arm rockable lever 34 which is fixed to a shaft 35 mounted in the frame 22. The other arm of said lever 34 is connected by a spring 36 to a fixed pin 37 on the frame 22 whereby said lever 34 tends to take the position shown in Fig. 4 and hold both the shutters 26 and 27 in open position. In the embodiment shown, an additional arm 34' on said lever 34 is connected by a link 33' to a duplicate set of shutters at the rear of the register indicator which shutters are formed and connected together in the same manner as shutters 26 and 27 and are thereby operated simultaneously therewith.

In back of lever 34 and loosely mounted for rocking movement on shaft 35 is an actuating lever 38, the outer end of which is connected by spring 39 to a fixed stud 40 on the frame whereby said lever 38 normally tends to assume the position shown in Fig. 4. A stop pin 41 on said frame 22 limits the clockwise movement of said lever 38. The lever 38 has a depending crank arm 42 provided with a stud 43 which extends into a notch 44 of a disk 45, the latter being fixed to the reset shaft 21. The lever 38 has a loose play connection to the lever 34 by means of a pin 46 being fixed to said lever 38 and extending through a slot 48 in said lever 34. Consequently the counterclockwise movement of lever 38 will likewise move lever 34 to close the shutter, but the slot 48 is of such length that lever 34 may have an independent counterclockwise movement sufficient to close the shutters 26 and 27 without moving lever 38.

When the reset shaft 21 is rotated for a zeroizing operation it will turn clockwise or in the direction of the arrow in Fig. 4, and as shown in Fig. 7 the stud 43 will be forced out of the notch 44 so as to ride on the peripheral surface of said disk 45. The counterclockwise movement of lever 38 thus obtained will through the pin 46 as described cause a similar counterclockwise movement of the lever 34 sufficient to close the shutters 26 and 27. Furthermore, the shutters will be held closed during the entire rotation of the disk 45 by reason of the stud 43 riding on the periphery of said disk and until the notch 44 again comes into position to receive the stud 43.

Provision is made for preventing the reset shaft from being turned backward at any time and particularly after it is once started forward for a zeroizing operation. Referring to Figs. 6, 7 and 8, there is mounted directly behind the reset shaft disk 45 and in effect integral therewith, a cam disk 49, the peripheral surface of which is cut away into a long arcuate notch 50 (shown in dotted lines) and a high part 51. At the lower side of the cam disk 49 and pivotally mounted at 52 on the frame 22 is a spring pressed back stop pawl 53, the end of which rides upon the peripheral surface of the cam disk 49. At the upper side of cam disk 49 also pivotally mounted on frame 22 at 54 is a second back stop pawl 55. This latter pawl is in the form of a two arm lever having a nose portion 56 and a tail portion 57 arranged as shown. A pin 58 projects from the underside of the lever 38 and is adapted to bear against the tail 57 at certain times to rock said pawl 55 clockwise as will be described.

In Fig. 6 the parts are shown prior to a resetting operation. When the crank arm 20 is operated to rotate the reset shaft said shaft turns clockwise as viewed in Fig. 6 and a very slight movement forward of the disk 49 with said shaft 21 will carry the long notch 50 beneath the end of back stop pawl 53 whereby the shoulder 59 in said notch in coaction with the pawl 53 will prevent any detrimental backward movement of said reset shaft 21 and disks 49 and 45. This backward movement of said disks is prevented during the time that the stud 43 is engageable with the notch 44 of said disk 45. Subsequent to the stud 43 leaving notch 44 and riding on the periphery of disk 45 no harm is accomplished in turning backward the reset shaft so long as it cannot be turned back far enough to reengage stud 43 in the notch 44, and such backward movement is prevented as described by cooperation of the pawl 53 with notched shoulder 59. The continued forward and clockwise rotation of shaft 21 brings the high part 51 of disk 49 beneath the tail 57 of pawl 55 and rocks said pawl slightly counterclockwise to bring the nose 56 of said pawl into the long notch 50 of disk 49.

The beginning of this action is shown by the position of the parts in Fig. 7. From that point on the reset shaft 21 and its disks may be rotated to the position shown in Fig. 8, at which time the nose 56 of pawl 55 engages the shoulder 60 of the long notch 50 and prevents further clockwise rotation of the reset shaft. This position is the limit of forward rotation for a zeroizing operation. It will be noted that in this position the reset shaft and its disks 45 and 49 have rotated slightly more than 360° and that the stud 43 of lever 38 is not completely down at the bottom of notch 44 in said disk 45. This slight overthrow of the reset shaft and its disks is for the purpose of insuring a complete zeroizing of the indicator dials. In this overthrow position the parts are held so as to keep the shutters 26 and 27 still closed. However, as soon as the attendant lets go of the reset shaft handle 20 which will occur since he cannot move it further in a clockwise direction, the force of spring 39 rotates lever 38 slightly clockwise to force the stud 43 deeper into the notch 44 and open the shutter and at the same time the disks 45 and 49 are forced back slightly to the end of the 360° movement or into the position shown in Fig. 6. At the same time pawl 55 is restored to the position shown by pin 58 of lever 38.

By the arrangement described it is apparent that the shutters 26 and 27 as well as the duplicate shutters at the rear side of the register will be closed as soon as the attendant starts turning the reset shaft 21 and will remain closed until said shaft is completely rotated, viz., slightly over 360°, and will then open when the shaft settles back to the end of the 360° movement, at which time the usual reset mechanism has had full opportunity to completely reset all the dials back to zero.

Referring now to Figs. 10, 11, 12 and 13, there will be described the means for effecting a closing of the shutter in the event that the control handle is turned on without having previously reset or zeroized the indicator. In these views appear in cross section the reset shaft 21 and rocking lever shaft 35 both mounted through the bearings in the control handle bracket 61 attached to the main casing 1. As shown in Fig. 5, the said shafts 21 and 35 are respectively connected by coupling members 21' and 35' across the intervening space between the frame 22 and the bracket 61. In effect the shafts 21 and 35 shown in Figs. 10 to 13 inclusive are integral respectively with the same shafts as shown in Figs. 4, 6, 7 and 8. However, it should be noted that the views of Figs. 10 to 13 show the parts looking in the direction of arrow C in Fig. 5 whereas in the views 6, 7 and 8, the parts are shown looking in the direction of the arrow B and therefore the indicated direction of rotation of shafts 21 and 35 in Figs. 10 to 13 will be opposite to that indicated in Figs. 6, 7 and 8.

Referring to Fig. 10, a rockable beam 62 is pivotally mounted on pivot stud 63 extending from the bracket 61. This stud 63 also furnishes a pivotal bearing for a toggle arm 64, the latter comprising parallel plates for straddling the beam 62. Carried between the plates of the toggle arm 64 are rolls 65, 66 and 67. A toggle thrust rod 68 has its lower end 69 pivotally engaged with pin 70 in the toggle arm 64 and its upper end extends slidably through a slotted and rocking pivot stud 71, the latter being mounted in the bracket 61. A thrust rod spring 72 surrounds the rod 68 and bears with one end against a shoulder at the lower end 69 of said thrust rod and with its other end against said rocking pivot 71.

The spring 72 tends to throw the toggle comprising rod 68 and arm 64 into either one of two positions; the position at the left shown in Fig. 10 for convenience being termed its uncocked position, and the position at the right as shown in Fig. 12 being termed its cocked position.

In the uncocked position of the toggle 68, 64, the roll 67 bears down on the shoulder of the beam 62 tending to rock the latter counterclockwise. In this position the right hand end 62' of said beam bears against a cam collar 73 fixed to the reset shaft 21 to thereby limit its movement in this direction. When the said toggle is in cocked position shown in Fig. 12, the roll 65 bears against the shoulder of said beam 62 and tends to rock the latter clockwise so that the end 62'' of said beam bears against a cam collar 74 fixed to the control handle shaft 75.

The right hand end of the rocking beam 62 carries a pawl 76 pivoted at 77 and having a spring 78 normally holding the pawl against the beam end 62'. A latch member 79 is pivotally and loosely mounted upon the shaft 35. A spring 80 is connected between said latch member 79 and a fixed stud 81 in the bracket 61 tending to rotate the latch member clockwise. The clockwise movement of said latch member 79 is limited by a stud 82 thereon striking the cam collar 73 as shown in Fig. 13. A driving pin 83 is fixed to the latch member 79 and is adapted to engage a projecting pin 84 fixed to the shaft 35 whereby the counterclockwise movement of the latch member 79 will similarly drive and rotate said shaft 35. The shaft 35 may, however, be rotated or rocked in a clockwise direction without moving the latch member 79. The latch member 79 also carries thereon a bell hammer 85 adapted to strike a gong 86 whenever the latch member 79 drops from the position shown in Fig. 10 to that shown in Fig. 13. The latch member 79 has an extension 79' adapted to be engaged and held by pawl 76 in the position shown in Fig. 10, and it will be released from said pawl 76 when the beam 62 is rocked clockwise as shown in Fig. 13.

The switch control member or handle 12 is fixed to the shaft 75 and also fixed on the inner end of said shaft 75 is the cam collar 74 having at one portion of its periphery a cam recess or depression 87. Also carried upon the cam member 74 is a pivoted spring pressed pawl 88 pivoted at 89 thereto and having a spring 90 normally tending to hold said pawl in outward position with respect to said cam collar 74. The control handle 12 is limited in its movement between "on" and "off"

positions by means of stop members 91, 92 on said handle shaft and fixed stop member 93 on the bracket 61. When the control handle 12 is moved from "on" to "off" position, pawl 88 engages roller 67 of the toggle 68, 64 and throws said toggle to the right, viz., from the position shown in Fig. 11 to that shown in Fig. 12. The reset shaft collar 73 has a cam 94 integral therewith in such position that when said reset shaft is rotated for zeroizing, viz., in the direction of the arrow of Fig. 12, the said cam 94 will engage rolls 66 and 65 of the toggle and throw the latter to its left position, viz., that shown in Fig. 11.

The operation of the shutter 26 through the instrumentalities associated with the control handle 12 will now be described. Fig. 10 shows the control handle in "off" position and also shows the toggle 68, 64 in its left or uncocked position, having been thrown to this position by a previous resetting operation of the reset shaft 21. With the parts in this position the attendant may turn the control handle 12 to "on" position as shown in Fig. 11 and nothing will happen with respect to the closing of the shutter 26. During the "on" movement of the control 12 the pawl 88 rides idly beneath the roll 67 of the toggle and the pawl 76 continues to retain the latch member 79 in latched position. At the end of the dispensing operation the attendant will throw the manual handle 12 back to "off" position as shown in Fig. 12. This movement will cause pawl 88 to kick the toggle 68, 64 to its right or cocking position. Then, if for the next dispensing operation, the attendant fails to operate the reset shaft and instead first turns the control handle from "off" to "on" position, the parts will act as shown in Fig. 13 wherein the recess 87 is brought beneath the end 62" of the beam 62 and allows the latter to rock slightly clockwise under the force of the toggle spring. This action may be termed the "release" of the cocked toggle. It serves to carry the latching pawl 76 away from beneath the end 79' of the latching member 79 whereupon said latching member 79 will be moved clockwise under the force of its spring 80 and give a signal by ringing bell 86. Likewise the clockwise movement of latch member 79 through pins 83 and 84 will rock the shaft 35 clockwise as viewed in Fig. 13, and counterclockwise as viewed in Fig. 4. This rocking movement of shaft 35 will rock lever 34 fixed thereto and close the shutters 26 and 27 as well as the other shutters on the rear side of the register. The closing of the shutters together with the ringing of the signal bell will warn the attendant that he has failed to reset the indicator. The closing of the shutters will also prevent the attendant from properly continuing his dispensing operation since he will not be able to tell how much gasoline is dispensed. In order to properly continue the dispensing operation, the shutters should be open and the only way to open the shutters is to operate the reset mechanism. A rotation of the reset shaft with the parts in the position shown in Fig. 13 will throw the toggle 68, 64 to the left and uncocked position, and also the cam 94 of said reset shaft will engage the pin 82 of the latch member 79 and restore it to its latched position on top of latching pawl 76. The restoration of latching member 79 to its latched position will permit the shaft 35 to rotate back to its position shown in Fig. 4 under the force of its spring 36, whereby the shutters 26 and 27 will be opened.

Thus it will be seen that if the attendant after shutting off the motor at the end of one dispensing operation thereupon resets the register indicator to zero before again turning on the control handle, the shutters 26 and 27 will not be closed, but if he fails to so reset, the turning on of said control handle will close said shutters. Furthermore, when said shutters are thus closed by an inadvertent turning on of the control handle they can be opened thereafter by rotating the reset shaft for a zeroizing operation. The same shutters which are used to conceal the indicator during the resetting operation are also employed to conceal the indicator when an improper start is made for dispensing, viz., turning on the motor switch without having previously reset the indicator.

I claim:

1. In liquid dispensing apparatus of the type having flow establishing means, a meter register operated in accordance with said flow with an indicator for showing the amount of liquid dispensed, and reset mechanism for zeroizing said indicator, the combination therewith of a shutter for said indicator adapted to open and close, means operated by said reset mechanism at the start of a zeroizing operation to close said shutter and at the end of said zeroizing operation to open said shutter, a control member having "on" and "off" positions corresponding to the starting and stopping of said flow, operating connections between said control member and said same shutter comprising cocking mechanism which when released from its cocked position serves to close said shutter and when in uncocked position is inert with respect to closing said shutter, means operated by the control member when moved to "off" position to cock said cocking mechanism, means operated by the control member when moved to "on" position to release said cocked cocking mechanism, and means operated by said resetting mechanism in zeroizing said register to uncock a previously cocked cocking mechanism.

2. In liquid dispensing apparatus of the type having flow establishing means, a meter register operated in accordance with said flow with an indicator for showing the amount of liquid dispensed, and reset mechanism for zeroizing said indicator, comprising a rotatable reset shaft, the combination therewith of a shutter for said indicator adapted to open and close, a shutter operating lever and a spring tending to hold the same in shutter open position, means operated by the rotation of said reset shaft to actuate said shutter lever to close the shutter at the start of rotation and release the shutter lever for shutter opening movement at the end of rotation of said reset shaft, a control member having "on" and "off" positions corresponding to the starting and stopping of said flow, operating connections between said control member and said shutter lever to actuate the latter for closing the shutter when said control member is moved to "on" position, and means operated by the rotation of said reset shaft prior to the "on" movement of said control handle for preventing the subsequent "on" movement of said handle from actuating said shutter lever.

WARREN H. DE LANCEY.